US008069471B2

(12) United States Patent
Boren

(10) Patent No.: US 8,069,471 B2
(45) Date of Patent: Nov. 29, 2011

(54) INTERNET SECURITY DYNAMICS ASSESSMENT SYSTEM, PROGRAM PRODUCT, AND RELATED METHODS

(75) Inventor: Dale W. Boren, Azale, TX (US)

(73) Assignee: Lockheed Martin Corporation, Bethesda, MD (US)

(*) Notice: Subject to any disclaimer, the term of this patent is extended or adjusted under 35 U.S.C. 154(b) by 550 days.

(21) Appl. No.: 12/255,391

(22) Filed: Oct. 21, 2008

(65) Prior Publication Data

US 2010/0100962 A1 Apr. 22, 2010

(51) Int. Cl.
*G06F 15/16* (2006.01)
*G06F 7/04* (2006.01)
*G06F 17/30* (2006.01)
*H04L 29/06* (2006.01)
*G06F 11/00* (2006.01)
*G06F 12/14* (2006.01)
*G06F 12/16* (2006.01)
*G08B 23/00* (2006.01)

(52) U.S. Cl. .............. 726/3; 726/15; 726/19; 726/22; 726/25; 713/150

(58) Field of Classification Search .......... None
See application file for complete search history.

(56) References Cited

U.S. PATENT DOCUMENTS

| | | | |
|---|---|---|---|
| 6,298,445 B1 | 10/2001 | Shostack | |
| 6,574,737 B1 | 6/2003 | Kingsford | |
| 6,952,779 B1 | 10/2005 | Cohen | |
| 7,096,503 B1 | 8/2006 | Magdych | |
| 7,146,642 B1 | 12/2006 | Magdych | |
| 7,213,264 B2* | 5/2007 | Poletto et al. .................... 726/22 |
| 7,832,004 B2* | 11/2010 | Schwartz et al. ............... 726/19 |
| 2003/0028803 A1 | 2/2003 | Bunker | |
| 2003/0135749 A1 | 7/2003 | Gales | |
| 2004/0064726 A1 | 4/2004 | Girouard | |
| 2005/0193430 A1* | 9/2005 | Cohen et al. ..................... 726/25 |
| 2006/0021049 A1* | 1/2006 | Cook .............................. 726/25 |
| 2006/0095961 A1* | 5/2006 | Govindarajan et al. ......... 726/15 |
| 2006/0195588 A1* | 8/2006 | Pennington et al. .......... 709/227 |
| 2008/0005555 A1* | 1/2008 | Lotem et al. ................. 713/150 |
| 2010/0043059 A1* | 2/2010 | Hinkemeyer et al. ............. 726/3 |

* cited by examiner

*Primary Examiner* — Shih-Hon Chen
(74) *Attorney, Agent, or Firm* — Bracewell & Giuliani LLP

(57) ABSTRACT

Systems, program product, and methods related to dynamic Internet security and risk assessment and management, are provided. For example, a system, program product, and method of identifying and servicing actual customer requests to a defended or protected computer or server can include the steps/operations of receiving by the defended computer, a service request from each of a plurality of IP addresses associated with a separate one of a plurality of service requesting computers, sending an inspection code adapted to perform a virtual attack on each existing service requesting computers at each respective associated IP address, and restricting provision of services from the defended computer to a subset of the service requesting computers identified for restriction when a security feature of the respective service requesting computer is determined to have been defeated by the virtual attack.

31 Claims, 8 Drawing Sheets

INTERNET SECURITY DYNAMICS ASSESSMENT SYSTEM, PROGRAM PRODUCT, AND RELATED METHODS

BACKGROUND OF THE INVENTION

1. Field of the Invention

The present invention relates generally to Internet security, and particularly to systems, program product, and methods of preventing and defeating network attacks, such as denial of service or other similar network attacks.

2. Description of Related Art

As more and more computer networks are linked to each other through open computer connections such as the Internet, computer network security has become increasingly more important. As such, when using a computer network, most computer users, including both home and business users, want to protect their computer systems from unauthorized accesses or to prevent their computers or computer networks from being disrupted. Current attempts to keep computer systems secure involve both hardware and software solutions. Hardware solutions have typically included filtering mechanisms which block access from users outside of a trusted computer user group and/or network. Software solutions have typically included monitoring network data, requiring/performing authentication, and monitoring network traffic to detect unauthorized intrusion and resource overload attempts. Notably, such strategies are exclusively defensive in nature.

Despite such efforts used to secure the computer network, the number of attacks on computer networks has continued to rise. Skillful attackers, e.g., hackers, continuously find ways to gain illegal access and/or cause disruption. As such, computer owners must continuously update their hardware and/or software in order to repel such attackers to thereby prevent the attacker from denying the computer owners access/use of resources, and/or preventing unauthorized use of such resources.

In order to reduce the probability of illegal access and/or disruption to a computer or computer network, system developers have created tools to test computer and/or network security. These tools include such things as vulnerability scans which identify potentially compromised ports, the revision levels of the software running on a system, etc. Developers may also simulate the actions of an unauthorized user to determine their system's potential vulnerabilities. It is assumed, or at least surmised, that the resulting test data provides sufficient information to allow the computer/computer network developer to locate potential network security loopholes/vulnerabilities within the computer/computer network. Computer/computer network administrators, or authorized third parties have taken to using these same tools for testing the integrity and/or vulnerability of their computer systems/networks. The methods or patches developed to close such security loopholes/vulnerabilities are typically disseminated to other computer or computer network owners, administrators, either through security service providers and/or various websites. Not all computer or computer network owners and administrators, however, stay vigilant in maintaining their systems in order to close any existing and/or newly discovered security loopholes.

Unfortunately, malicious individuals also have access to these same tools that can allow them to identify computers having potential vulnerabilities. Accordingly, such individuals can readily determine which computers/computer networks can be breached in order to gain access to the data and/or to take remote control of such computers. Such remotely controlled computers are often called "robot computers" or simply "bot" computers.

Gaining access to a computer system is not the only way malicious individuals are able to cause disruption to a computer or computer network. One methodology of disrupting the computer or computer network is called a denial of service attack (or more correctly, distributed denial of service attack) whereby multiple computers, typically geographically spaced apart, begin sending multiple service requests to a target computer or network to overwhelm the target computer or network, causing the target computer or network to be unable to continue to provide services to legitimate users.

Malicious individuals' who have taken remote control of a computer system may use it as a robot (i.e., "bot") without the owner's knowledge and/or permission to attack a third party computer system and/or network. Combinations of these remotely controlled "bot" systems may be formed into networks (i.e., "botnets") to increase the effectiveness of an attack on a third party system and/or network. One manner in which such bot networks have been utilized by malicious individuals has been to launch denial of service attacks on specific targeted computers and/or networks. Such has been accomplished by causing the bot controlled computers in the bot network to each generate multiple service requests to the specific target computer or computer network, thus, causing the target computer or network to be overwhelmed to a point of having to terminate providing services. The bot network typically consists of a relatively large number of remotely controlled ("hijacked") computers. To establish the bot network, an attacker uses some type of malicious software code such as, for example, a Trojan horse application or other virus or worm, etc., to take control of a multitude of vulnerable computers.

An example of a broad spectrum, geographically distributed, denial of service attack occurred in Estonia beginning on Apr. 27, 2007, and lasted for months, effectively shutting down certain Estonian government computers. Such attack used multiple global bot networks, proxy servers located in third countries, and nonexistent or spoofed IP addresses. The initial attack was fairly unsophisticated; however, as the attack progressed, so did the level of sophistication. As Estonian authorities blocked major portions of the Internet, the attacks began shifting to other computers and other geographic locations, rendering the targeted computers unable to provide services to legitimate users. The Estonian government was kept constantly on the defensive as the attackers changed the resources used in mounting the attack over time. This example demonstrated critical weaknesses in a purely defensive security strategy with limited automated responses.

Accordingly, recognized by the inventor is the need for an offense strategy that can allow the protected computer or computer network to automatically overcome a denial of service attack, and continue to provide services to a substantial portion of the authorized users and/or legitimate customers. Also, recognized is the need for an automated way of identifying actual customer requests while blocking spoofed, nonexistent and/or bot service requests. Further, recognized by the inventor is the need for a system, program product, and methods that, during a denial of service type attack, can identify computers requesting service from the target computer or computer network that are not only potentially vulnerable, but proven vulnerable to being controlled, so that such bot controlled or bot controllable computers can be selectively blocked and/or targeted for shutdown in order to allow for the provision of continued service to authorized users and/or legitimate customers having computers which are not vulnerable to bot control. Also recognized is the need for a system, program product, and methods that can utilize secondary computers allied with the protected computer to perform the function of determining whether or not a service requesting computer is an authorized user and/or legitimate customer computer, to free up the resources of the protected computer. Also recognized is the need for a system, program product, and methods that can: recognize the existence of a denial of service attack embedded in communications from a plurality of IP addresses; initially block the plurality of IP addresses; call back each of the IP addresses to re-establish communications to thereby initiate an offense strategy (e.g., either submit an authentication request or initiate a virtual attack on the computer system associated with each IP addresses); determine whether or not the computer system associated with each of the IP addresses is vulnerable to malicious code; and for each computer system found to be vulnerable, restrict access to a protected computer system.

SUMMARY OF THE INVENTION

In view of the foregoing, embodiments of the present invention provide systems, program product, and methods of preventing and defeating a network attack on a defended (protected) computer or computer system that can proactively identify, not only malicious software vulnerabilities of computers accessing a defended computer/server, but that can demonstrate an actual ability to penetrate the system defenses of computers accessing the defended computer/server. Embodiments of the present invention also provide systems, program product, and methods of preventing and defeating a network attack on a defended (protected) computer or computer system, that can restrict the vulnerable system's access to the defended computer or system resulting from determining a malicious software vulnerability and/or defense breach, to thereby allow continued provision of services to a large majority of requesting authorized users and/or legitimate customers—particularly those not identified as vulnerable to, or penetrable by, known malicious software. Advantageously, such systems, program product, and methods can employ an offensive strategy, exploiting the same Internet vulnerabilities used by attackers', to prevent and defeat their malicious attacks, especially denial of service and similar network attacks.

Embodiments of the present invention include systems that can function to provide security and dynamic risk assessment and management. For example, a system, according to an embodiment of the present invention, can include a defended server in communication with a secure local area network and in further communication with a plurality of secondary network computers (i.e., allied recourses). Both the server and the secondary network computers can include memory which can contain both accepted (allowed access) IP address and blocked IP address lists, and at least respective portions of security and dynamic risk assessment and management program product, which can function to identify and allow for servicing actual customer requests to a defended server during a denial of service type attack or other similar attack.

According to an embodiment of the present invention, the security and dynamic risk assessment and management program product stored in the memory of the defended server, can include instructions that when executed by the defended computer, cause the defended computer to perform the operations of accepting and/or blocking IP addresses of each separate one of a plurality of communication requesting computers attempting to communicate with the defended computer during a denial of service type attack, initiating a virtual attack on each of the communication requesting computers (typically through secondary network computers) to determine if the respective communication requesting computer can be compromised by an inert malicious software code associated with the virtual attack to thereby add the computers, found to be invulnerable, to an acceptance list, and resuming communications with each of a plurality of computers found to be invulnerable to each vulnerability scheme associated with the virtual attack. The operations can further include restricting provision of communications from the defended computer to a subset of the plurality of communication requesting computers during the denial of service type attack, with each respective communication requesting computer of the subset of the plurality of communication requesting computers: identified for restriction when a security feature of the respective communication requesting computer determined to have been defeated by any one of the vulnerability schemes associated with the virtual attack, and correspondingly added to a restricted or blocked IP address list, for example. Further, the operations can include retrieving or otherwise receiving from one or more secondary network computers at least one of a list of restricted or blocked IP addresses and a list of accepted IP addresses formed responsive to the respective virtual attack on each separate communication requesting computer.

According to an embodiment of the present invention, the security and dynamic risk assessment and management program product stored in the memory of each separate one of the secondary network computers can include instructions that when executed by a secondary network computer, cause the secondary network computer to perform the operations of: receiving one or more of the following: indicia that a network defended server is encountering a denial of service type attack, or instructions to call back, initiate a virtual attack, and optionally initiate user response requests, on a plurality of communication requesting computers associated with a set of a plurality of initially blocked IP addresses; and attempting to communicate with each of the plurality of communication requesting computers associated with the set of the plurality of initially blocked IP addresses to identify each actual authorized user and/or legitimate customer IP address of the plurality of initially blocked IP addresses and to eliminate non-existent or spoofed IP addresses from the set of initially blocked IP addresses to thereby form a set of actual legitimate customer IP addresses. The operations can also include sending a separate copy of an inspection code adapted to perform the virtual attack on the respective communication requesting computer, to each communication requesting computer associated with one of the set of initially blocked IP addresses, and receiving a notification from each respective inspection code indicating if the virtual attack successfully defeated one or more of the security features of the respective attacked communication requesting computer.

The operations can further include assembling one or more lists indicating accepted IP addresses of attacked communication requesting computers found to be invulnerable to the virtual attack, or restricted IP addresses of attacked communication requesting computers that should remain blocked or restricted as being found to be actually vulnerable to at least one vulnerability scheme provided in the respective virtual attack and communicating one or both of these lists to the defended server. Advantageously, the one or more lists are usable by the defended server to allow resumption of communication with each of the attacked communication requesting computers on the accepted IP addresses list, while simultaneously restricting communications with each of the attacked communication requesting computers on the restricted IP address list.

Embodiments of the present invention also provide methods of identifying and servicing actual customer requests to a defended network computer or server. For example, a method, according to embodiments of the present invention, can include receiving by the defended network computer, a service request from a service requesting computer having an associated IP address, and sending an inspection code to the service requesting computer at the associated IP address. The inspection code is adapted to perform a simulated attack on the respective service requesting computer system and to notify the defended network computer or a secondary network computer associated therewith if the simulated attack successfully defeated a security feature of the service requesting computer, or alternatively, if the simulated attack failed to defeat any tested security feature of the service requesting computer. The method can further include the steps of restricting, e.g., limiting or denying, provision of services to the service requesting computer from the defended network computer or server responsive to determining that a security feature of the service requesting computer has been defeated by the simulated attack.

The method can also include sending a user response request message to the service requesting computer, for example, if the service requesting computer is determined to be invulnerable to the simulated attack, i.e., if the simulated attack failed to defeat any tested security feature; and sending a user response request message to the service requesting computer responsive to being determined to be invulnerable. The user response request message is configured to query the user of the service requesting computer at the associated IP address to acknowledge the original service request, thus, identifying the originator of the actual customer request. Accordingly, the method can include the steps of restricting, e.g., limiting or denying, provision of services to the service requesting computer from the defended network computer or server responsive to either determining that a security feature of the service requesting computer has been defeated by the simulated attack (failure of "vulnerability" test), or restricting provision of services to the service requesting computer if it fails to acknowledge the original service request (failure of "spoof" test).

A method, according to another embodiment of the present invention, can include the steps of receiving by a defended computer, a service request from each of a plurality of IP addresses each associated with a separate one of a plurality of service requesting computers, and sending an inspection code adapted to perform a virtual attack, to each separate one of the plurality of service requesting computers at each respective associated IP address responsive to receiving the respective service request from the each separate one of the plurality of service requesting computers. The method can also include the steps of restricting provision of services from the defended computer to a subset of the plurality of service requesting computers. Each of the respective service requesting computers of the subset of the plurality of service requesting computers is identified for restriction when a security feature of the respective service requesting computer is determined to have been defeated by the virtual attack.

A method, according to another embodiment of the present invention, includes the step of determining an existence of a denial of service attack on a defended computer responsive to a number or frequency of requests from one or more of a plurality of IP addresses exceeding a preselected threshold value. The plurality of IP addresses can include a plurality of substantially protected actual customer IP addresses associated with a corresponding plurality of substantially protected actual customer computers, and a plurality of robot program IP addresses associated with a plurality of substantially unprotected computers. The method can also include the steps of at least initially blocking the plurality of IP addresses (both actual customer IP addresses and robot program IP addresses) responsive to determining the existence of the denial of service attack, performing a virtual attack separately on each of the plurality of blocked IP addresses (e.g., typically using a plurality of secondary network computers) followed by a user response request to an uncompromised subset of these IP addresses to thereby identify a subset of the plurality of IP addresses each associated with a separate one of the plurality of substantially protected actual customer computers, and resuming service to the identified subset of the plurality of IP addresses during the denial of service attack while simultaneously maintaining a block on the plurality of robot program IP addresses.

Embodiments of the present invention advantageously provide a paradigm shift whereby a defended computer or computer network is protected by "offensively" assessing an actual (i.e., demonstrated), rather than a potential (via a scanner), vulnerability of each requesting user computer wishing to communicate with the protected computer. By blocking the initial communication link and then reestablishing a new communication link via calling back and using a virtual inert simulated attack on the requesting user computer, services may be limited/denied to the requesting user computer based upon the results of a demonstrated, not an assumed, vulnerability. Traditional system protection methodologies, whether filtering, signal/behavior monitoring, etc., are "defensive" in that the requesting computer initiates and controls the communication link, whereas the present invention breaks the initial communication link and then reestablishes it, thus taking control and enabling a large scope of "offensive" methodologies—one of which is to assess the strengths of client systems requesting services and to generate a counterattack to disable each demonstrated vulnerable service requesting computers. Note: such a counter attack would be expected to require some form of legal authorization.

A denial of service type attack typically begins as an overwhelming number of IP addresses requesting services from a targeted computer. These addresses may be (1) randomly generated nonexistent addresses, (2) real but spoofed addresses, (3) addresses of remotely controlled systems or "bot" addresses, and/or (4) IP addresses from actual customers legitimately requesting services. According to most scenarios, the protected computer/computer system initially blocks all incoming IP addresses once a trigger limit (i.e., the number and frequency of requests) has been reached, thus denying services to all requests. This initial blocking of IP addresses breaks, or fails to establish, a communications link between the requesting IP address and the protected computer or network and is followed by whatever recovery scheme has been placed on the protected system. According to various embodiments of the present invention, a separate set of resources is utilized to "call back" previously blocked requesting addresses and determine, if such addresses should be serviced. This allows the target of a denial of service type attack to automatically come back on line and serve many of its customers, even though a denial of service type attack is still in progress. Identification of actual verses bogus customer IP addresses can require a number of tests such as, for example, determining or identifying the frequency of repeated requests, determining whether the requesting IP address is listed as a previous customer, etc. Advantageously, according to an embodiment of the present invention, one such test can be a "virtual inert simulated attack" launched against the requesting system, which can provide a "nondestructive" testing/analysis procedure. A virtual inert simulated attack (visa) created from a recent successful virus rendered "inert" and "non-replicating" can identify requesting systems that have not been patched since the recent version of the simulated virus became available. Note: more than one type of virtual inert simulated attack (visa) could be run to analyze a system's defenses, however, the virtual attacks need not proceed beyond discovery of the first actual security breach. Advantageously, according to an embodiment of the present invention, another such test can be a "user response request" provided to establish the existence or nonexistence of a "human-in-the-loop."

Based upon the information generated about a specific requesting IP address, advantageously, the IP address can be either added to an acceptance address list or added to a blocked/restricted address list. Assuming that actual customers will, for a time, continue to request services, this acceptance list will allow specific IP addresses to pass and be served in a normal manner. Maintaining the blocked/restricted address list advantageously can enable additional targeted actions. A rejection list with an identified/known method for attacking the rejected system can be provided to legal authorities to enable such authorities to initiate a targeted counterattack against the identified vulnerable systems as individuals or in groupings, as required. This capability can be extremely valuable in an Estonia-like broad area denial of service attack.

Actually knowing what attack method is successful against individual systems in a bot network can advantageously enable legal authorities to: request system users to shut down their systems as they have been identified as active participants in an on going denial of service attack; or if the system owner's do not voluntarily comply within a specific time period, legal authorities could remotely shut these systems down, for example, by launching a counterattack against the computer system, e.g., using the determined vulnerability scheme. In an Estonia like scenario, this could result in freeing up network bandwidth, thus restoring the targeted network to order. Note, before shutting a system down, authorities would likely need to compare the vulnerable IP addresses against vital infrastructure IP addresses such as hospitals, police, etc., to ensure that such systems are not inadvertently shut down. Nevertheless, the respective system administrators could be made aware of their IP address' use in a denial of service attack, whereupon they could take the appropriate action. Since an actual breach of their security was virtually made, the system administrators could also be informed as to how to secure their systems.

BRIEF DESCRIPTION OF THE DRAWINGS

So that the manner in which the features and advantages of the invention, as well as others which will become apparent, may be understood in more detail, a more particular description of the invention briefly summarized above may be had by reference to the embodiments thereof which are illustrated in the appended drawings, which form a part of this specification. It is to be noted, however, that the drawings illustrate only various embodiments of the invention and are therefore not to be considered limiting of the invention's scope as it may include other effective embodiments as well.

DETAILED DESCRIPTION

The present invention will now be described more fully hereinafter with reference to the accompanying drawings, which illustrate embodiments of the invention. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art. Like numbers refer to like elements throughout.

Referring to FIGS. 1A-7, embodiments of the present invention include a system, program product, and methods, which provide both security dynamic risk assessment, and automated responses. According to a preferred generalized embodiment of the present invention, a computer/server being protected includes software or program product that can proactively determine the vulnerability of a computer/system requesting access to the protected computer/server and confirm a service request via a "human-in-the-loop" user response. Vulnerability is determined, for example, by "pinging" a computer/system requesting service ("requesting" or "communication requesting computer/system") with an inspection code (e.g., "inert" virus/marl-ware/spam code) which can launch a "simulated" attack on the requesting computer/system's defenses. If the defenses are defeated, the inspection code sends a message back indicating that the requesting computer/system is vulnerable to malicious software code along with what type of simulated attack succeeded. Sending back a flag or tag denoting what type of attack was successful goes beyond simple vulnerability scanning—enabling counter measures to be deployed against systems used in attacking the protected system. "Human-in-the-loop" confirmation is determined, for example, by sending a user response request message to a computer/system requesting service.

Figure 1A:
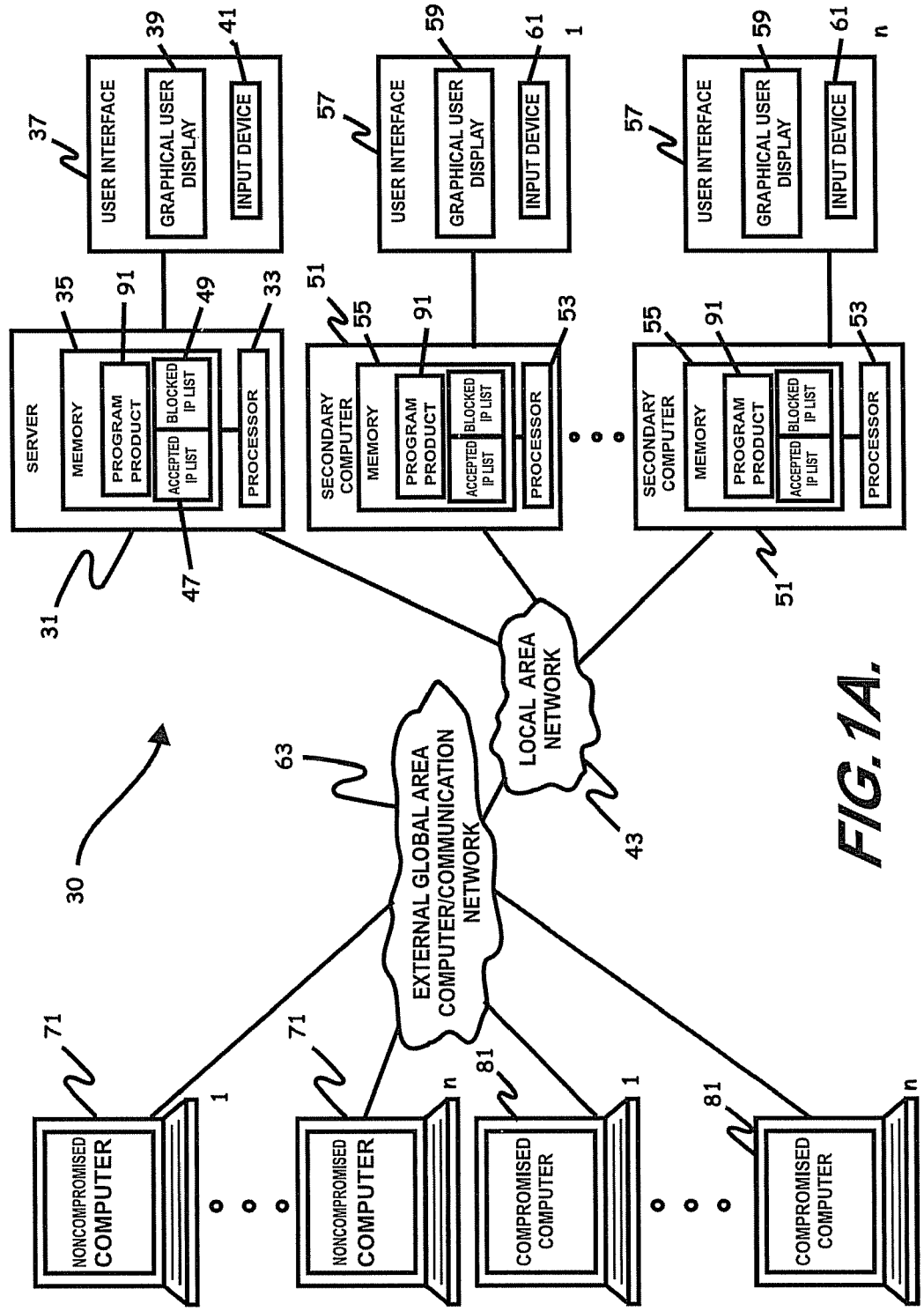
FIG. 1A is a schematic block diagram of a system for providing security and dynamic risk assessment and management according to an embodiment of the present invention.

More specifically, as shown in FIG. 1A, a system 30 for providing dynamic Internet security and risk assessment, according to an embodiment of the present invention, can include, for example, a defended (protected) computer, e.g., service provider or providing server 31. Such server 31 contains or otherwise includes a processor 33, and memory 35 coupled to the processor 33 to store software, such as, for example, operating system software and security and dynamic risk assessment and management program product 91 (described later), and to store accepted/blocked IP address tables/lists 47, 49 (described later) therein, for example, connected directly to system/non-system components and/or networked to such components. Note, the memory 35 can include volatile and nonvolatile memory known to those skilled in the art, including, for example, RAM, ROM, and magnetic or optical disks, just to name a few. Further, the memory 35 can include separate physical components 35', 35", such as those illustrated, for example, in FIG. 1B.

The system 30 can also include a user interface 37, which can include a graphical display 39 for displaying graphical images, and a user input device 41 as known to those skilled in the art, to provide a user access to manipulate the software, database records and accepted/blocked IP address lists, e.g., lists 47, 49. Accordingly, the user interface 37 can be either directly connected to the server 31, or through portions of a local area network 43, as known to those skilled in the art, to provide access to the server 31, for example, by network administrators.

Figure 1B:
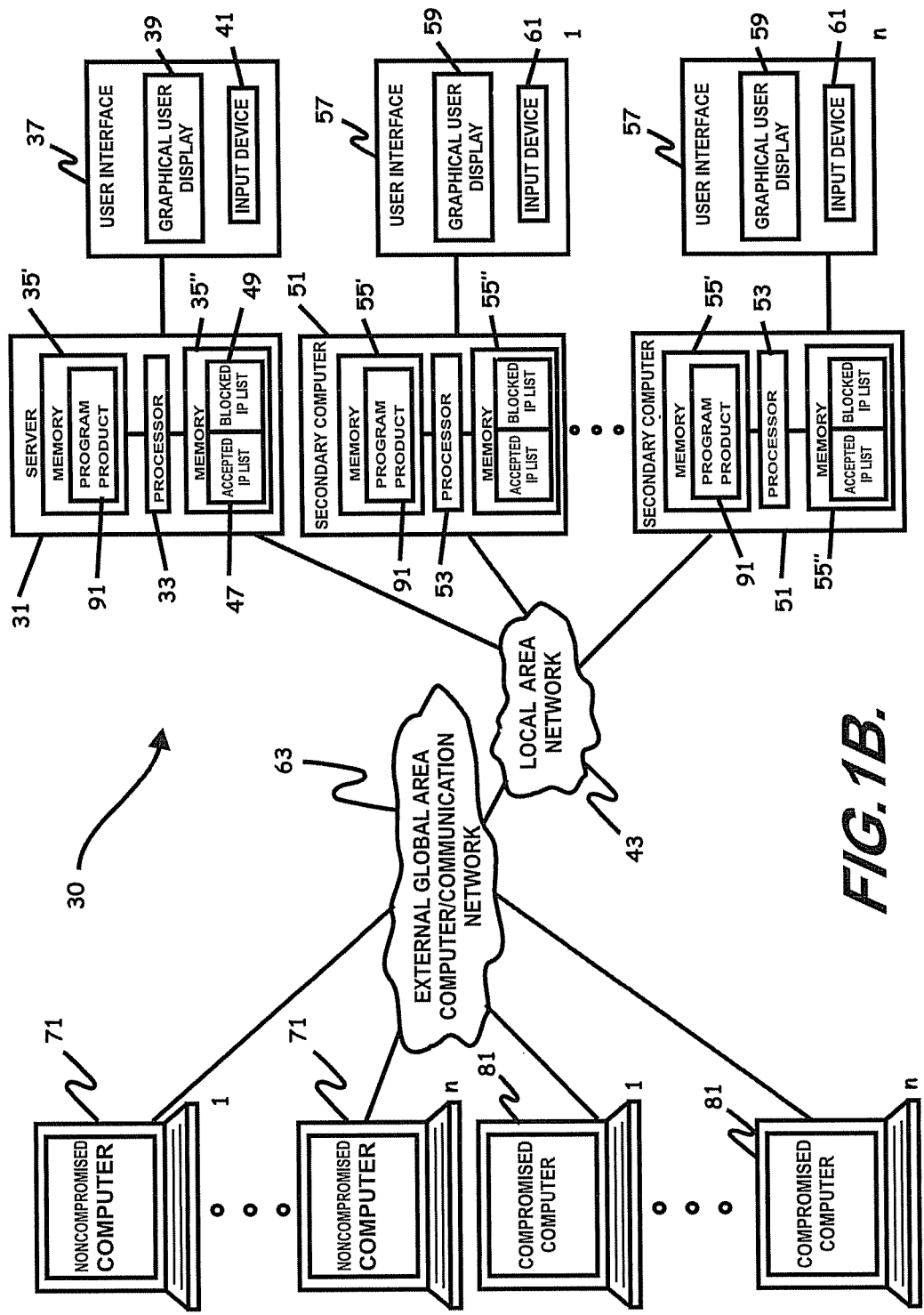
FIG. 1B is a schematic block diagram of a system for providing security and dynamic risk assessment and management according to another embodiment of the present invention.

Note, it should also be understood that the preferred server configuration of server 31 is given by way of example and that other types of servers or computers configured according to various other methodologies known to those skilled in the art can be used. The server 31 shown schematically, for example, in FIGS. 1A and 1B represents a server or server cluster or server farm and is not limited to any individual physical server. The server site may be deployed as a server farm or server cluster managed by a serving hosting provider. The number of servers and their architecture and configuration may be increased based on usage, demand and capacity requirements for the system 30.

As noted above, the memory 35, 35" (internal or external, networked, or non-networked) of the server 31 can contain an accepted IP address list 47 and a blocked IP address list 49. The accepted IP address list 47 can include a list of previous and new customer IP addresses of computers 71, having demonstrated invulnerabilities to malicious software, having confirmed service request, for example, via user response and cleared for continued provision of services. This portion of the list is generally temporary as any IP address can be spoofed or become vulnerable at any time. The accepted IP address list 47 can also include the IP addresses of a plurality of allied assets, e.g., addresses of secondary computers 51 (described below) in order for the server 31 to maintain communication therewith during a denial of service (DOS) or other type of attack, which may tend to flood the input ports to the server 31 with requests for service. The blocked IP address list 49 can include the IP addresses of customer and non-customer computers 81 having demonstrated vulnerabilities to malicious software and customer and non-customer computers 71 determined invulnerable, but nevertheless determined to not have a "human-in-the-loop," or to have a "non-responsive operator" e.g., spoofed computers. Note, each accepted IP address list 47 and blocked IP address list 49 can be implemented as a single table or as a plurality of tables as known and understood by those skilled in the art.

The system 30 can also include a plurality of secondary computers 51 in communication with the server 31 through portions of the local area network 43. The secondary computers 51 can include various computers having available network resources distributed throughout the local area network 43. The secondary computers 51 can include computers such as administrative/office personnel computers, etc. According to an embodiment of the present invention, each of the secondary computers 51 can contain or otherwise include a processor 53, and memory 55 coupled to the processor 53 to store software and accepted/blocked tables/lists, etc. therein, for example, connected directly to system/non-system components and/or networked to such components. Note, the memory 55 can include volatile and nonvolatile memory known to those skilled in the art, including, for example, RAM, ROM, and magnetic or optical disks, just to name a few. Further, the memory 55 can include separate physical components 55', 55", such as illustrated, for example, in FIG. 1B.

Each of the secondary computers 51 also include a user interface 57 which can include a graphical display 59 for displaying graphical images, and a user input device 61 as known to those skilled in the art, to provide a user access to manipulate the software, database records, and local segments of accepted/blocked IP address lists 47, 49. As will be described in more detail below, beneficially, the network resources of such computers 51 can be tapped to reduce the resource demand on the server 31 during periods where the server 31 is experiencing high network resource utilization requirements.

According to an embodiment of the present invention, the server 31 and the secondary computers 51 are both in communication with an external global area computer/communication network 63, such as the Internet, through the local area network 43. As will be described in more detail below, the global communication network 63 is further in communication with both uncompromised computers 71 and other service requesting computers which can include computers 81 that likely have been hijacked through use of malicious software, for example, to form a bot network as known to those skilled in the art, or computers whose IP address has been spoofed. Note, indication of the existence of a spoofed IP address is not considered an indication that the computer associated therewith has been compromised. Further, similar to the procedures with respect to vulnerable IP addresses, blocked spoofed IP addresses should be tagged to identify the kind or type of response or non-response was received by the queried human operator (user).

The system 30 can include security and dynamic risk assessment and management program product 91. The program product 91, according to a preferred configuration, can include a server portion stored in memory 35 of the server 31, and a secondary computer portion stored in the memory 55 of each of the secondary network computers 51. The program product 91, according to an embodiment of the system 30, is adapted: to determine the existence of a denial service or other such attack on the defended or protected server 31; to at least temporarily (i.e., initially) block the IP addresses of the service requesting computers 71, 81, attempting to communicate with the defended server 31 during the denial of service type attack; to attempt to communicate (call back) with each of the computers 71, 81, associated with the initially blocked IP addresses; to determine which of the initially blocked IP addresses are associated with real (i.e., existing, working) IP addresses; to perform a virtual inert simulated attack (visa) on each of the computers 71, 81, followed by sending a user response request to those computers shown to be invulnerable to this simulated attack to determine which of the IP addresses are associated with compromised computers 81 or spoofed IP addresses; and to resume providing service to the actual customer computers (users) 71 associated with the initially blocked IP addresses that were found invulnerable to the virtual or simulated attack, and which return a positive user response upon request.

Note, "real" (i.e., existing, working) IP addresses can be identified, for example, by sending out a "syc" request and receiving an "ack" back within a "time out" period. Any computer/computer system at an IP address that does not respond within the time limit can be considered to be a non-working, nonexistent or "non-real." Those responding within the time limit are considered working, existent or "real." Note, the "syc" and "ack" terms are specific to the TCP/IP internet protocol, but calling and receiving functions like "syc" and "ack" can be implemented by most internet protocols, thus, it should be clear that such terms are utilized by way of example, and should not be considered limiting.

Note also, an "actual" customer (user) IP address may be identified by sending out a user response request (urr) and receiving a human actuated response back within a "time out" period. Any service requesting computer/computer system at an IP address that does not respond within the time limit or that returns a negative response can be considered to be a spoofed IP address. According to an embodiment of the present invention, the user response request can allow for new customers, as well as previous customers, to access the protected computer/computer system's services during an on going denial of service attack. It is recognized that limited resources are available to send and await a human response to a user request, therefore, only those systems which have proven invulnerable to a simulated attack or provided a less functional vulnerability scan are sent a user response request. Thus, filtering out noncustomer profile service requests, testing for existence/nonexistence of an IP address, followed by a simulated attack substantially proving invulnerability, can beneficially reduce the number of requesting computer/computer systems requiring a user response request to confirm an "actual" customer's (user's) original service request.

In the preferred configuration, a portion of the above-described function, and others described below, are performed by the service providing server 31, a portion are performed by one or more of the secondary computers 51, and a portion are performed by an independently functional inspection code including the virtual inert simulated attack (visa) followed by a user response request code which is preferably sent to the service requesting computers 71, 81, from the one or more secondary computers 51.

Note, the security and dynamic risk assessment and management program product 91 can be in the form of microcode, programs, routines, and symbolic languages that provide a specific set for sets of ordered operations that control the functioning of the hardware and direct its operation, as known and understood by those skilled in the art. Note further, the security and dynamic risk assessment and management program product 91, according to an embodiment of the present invention, need not reside in its entirety in volatile memory of either computer 31, 51, but can be selectively loaded, as necessary, according to various methodologies as known and understood by those skilled in the art of computer systems. Still further, at least portions of the program product 91 can be installed on the computers 31, 51, as a single executable or as multiple executable programs, including, for example, an automated response program configured to perform the "callback" function.

In operation, when a service request is received by a defended (protected) computer/server 31 or computer system, the defended server 31 or the allied secondary network computer 51 can "ping" the requesting computer with an inspection code made up of "inert", non-replicating virus/marl-ware/spam code, back-door scanning, and/or similar code. This inspection code can launch a "simulated" "virtual" attack on the requesting computer's defenses. If the defenses are defeated, the inspection code sends a message back to its originating computer 31, 51, indicating that the requesting computer 71, 81, is vulnerable to malicious software and should not be allowed to receive the services requested. The return message can also include an attack tag indicating which type of simulated attack was successful. For those requesting computers 71, 81, which prove invulnerable to this simulated attack, the defended (protected) computer/server 31 or the allied secondary network computer 51 sends out a user response request (urr) message, e.g., a pop-up template or email etc., requiring a human response which, if successful, proves a "human-in-the-loop." The response can indicate the human's intention either to request services from the defended system, or not. Thus, a human response can differentiate actual users from spoofed IP addresses. Optionally, for vulnerable computer/computer systems, the inspection code can send, e.g., a pop-up or email, informing the requesting computer that its computer system is vulnerable to malicious software and that its request for service is being denied or limited. Additionally, the pop-up or e-mail could identify the type of vulnerability, while listing patches the operator of the vulnerable computer should install, etc. Such notification is not necessary, but may be good public relations. It is not expected that providing user information to vulnerable systems would be any more annoying than being notified to upgrade software in order to download an application, as is customary.

Figure 2:
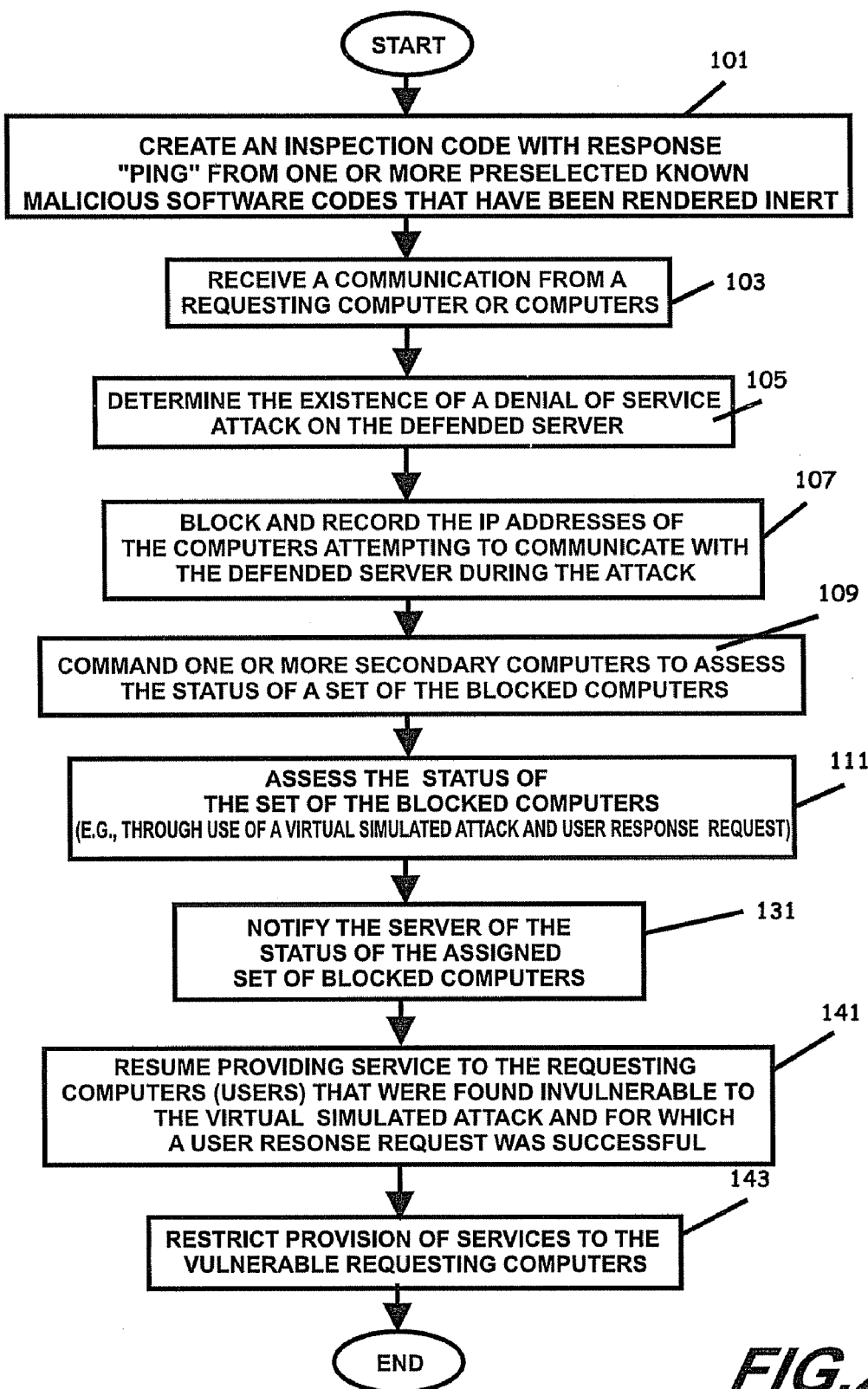
FIG. 2 is a schematic flow diagram of a method and operations for security and dynamic risk assessment and management according to an embodiment of the present invention.

FIG. 2 provides a high-level flow diagram illustrating a method (and operations) for providing security and dynamic risk assessment and management to include identifying and servicing real customer requests to a defended (protected) server, e.g. server 31. According to the illustrated embodiment of the present invention, the method can include the steps of first creating an inspection code developed from one or more preselected known malicious software code (e.g., recent successful viruses, marl-ware, spam-code), first rendered inert, and non-replicating which can be used along with other such code as back-door scanning, etc., in simulated inert virtual attacks (block 101), described in more detail below. That is, the inspection code should include a sterile version of a recent attack code or codes. This can be loosely analogous to creating a vaccine using a dead virus or portions thereof. Beneficially, the number of attack codes, and thus, the number of "kinds" of attacks can limit the number of virtual attacks needed to determine if a computer system's security may be readily breached. That is, it is not necessary to create code for a virtual attack for every type or version of a known virus, but rather, to create at least one virtual attack based on the likely more successful vulnerability exploitation scheme. More typically, the number of attack codes is a relatively finite plurality of virtual inert simulated attacks based on the major categories of vulnerability exploitation scheme, including known backdoors.

In order to reduce the workload on the expected target, e.g., server 31, the inspection code is distributed to the various secondary computers 51 within the network which typically have available communication resources. According to a preferred configuration, the inspection code is distributed with the client/secondary computer portion or configuration of program product 91. This client portion allows the individual secondary computers 51 to autonomously execute portions of the task of determining which computers 71, 81, are involved in an attack, when instructed to do so by the server 31.

Still referring to FIG. 2, having loaded the program product 91 on both the server 31 and selected secondary computers 51, steps can include receiving at least one, but more typically a plurality of communications from a substantial number of requesting computers 71, 81 (block 103), and determining, typically from the number and frequency of requests, the existence of a denial service or other similar attack on the server 31 (block 105). In response to the large number of communication attempts (referred to as service requests), the server 31 typically blocks and records the IP addresses of all or most of the computers 71, 81, attempting to communicate with the server 31 during the attack (block 107). Hence the name, "denial of service." Such an attack causes the server 31 to be unable to adequately provide services to authorized users and/or legitimate "customers." Note, although using the terminology "denial of service attack," it is assumed that this phrase extends broadly to other types of similar attacks including, for example, distributed denial of service attacks, which is actually the proper name used for what is being described herein.

According to embodiments of the present invention, however, the server 31 can notify or otherwise command at least one, but typically a plurality of allied secondary computers 51, of the existence of the attack (block 109), to assess the status of a set of the blocked computers 71, 81 (block 111). Note, alternatively, each of the allied secondary computers 51 can recognize the existence of an attack and initiate the recovery procedures, independently. According to a preferred configuration, this notification by the server 31 includes sending or otherwise identifying the IP address of each of a set of requesting computers 71, 81, to the secondary computers 51. That is, if multiple secondary computers 51 are to be utilized, the blocked IP list 49 can be divided among the computers 51 to allow parallel processing, to thereby increase the speed at which the server 31 can regain near normal operations with respect to providing services to customers. Note also, according to this exemplary embodiment of the present invention, the connection between the protected system (e.g., server 31) and its allied assets (e.g., computers 51) must be maintained (i.e., not vulnerable) during a denial of service attack to allow communication between the server 31 and the allied secondary computers 51. This can be accomplished by placing the IP address of server 31 on the accepted IP list for each secondary computers 51 and placing the IP addresses of each secondary computer 51 on the accepted IP list of the server 31.

Figure 3:
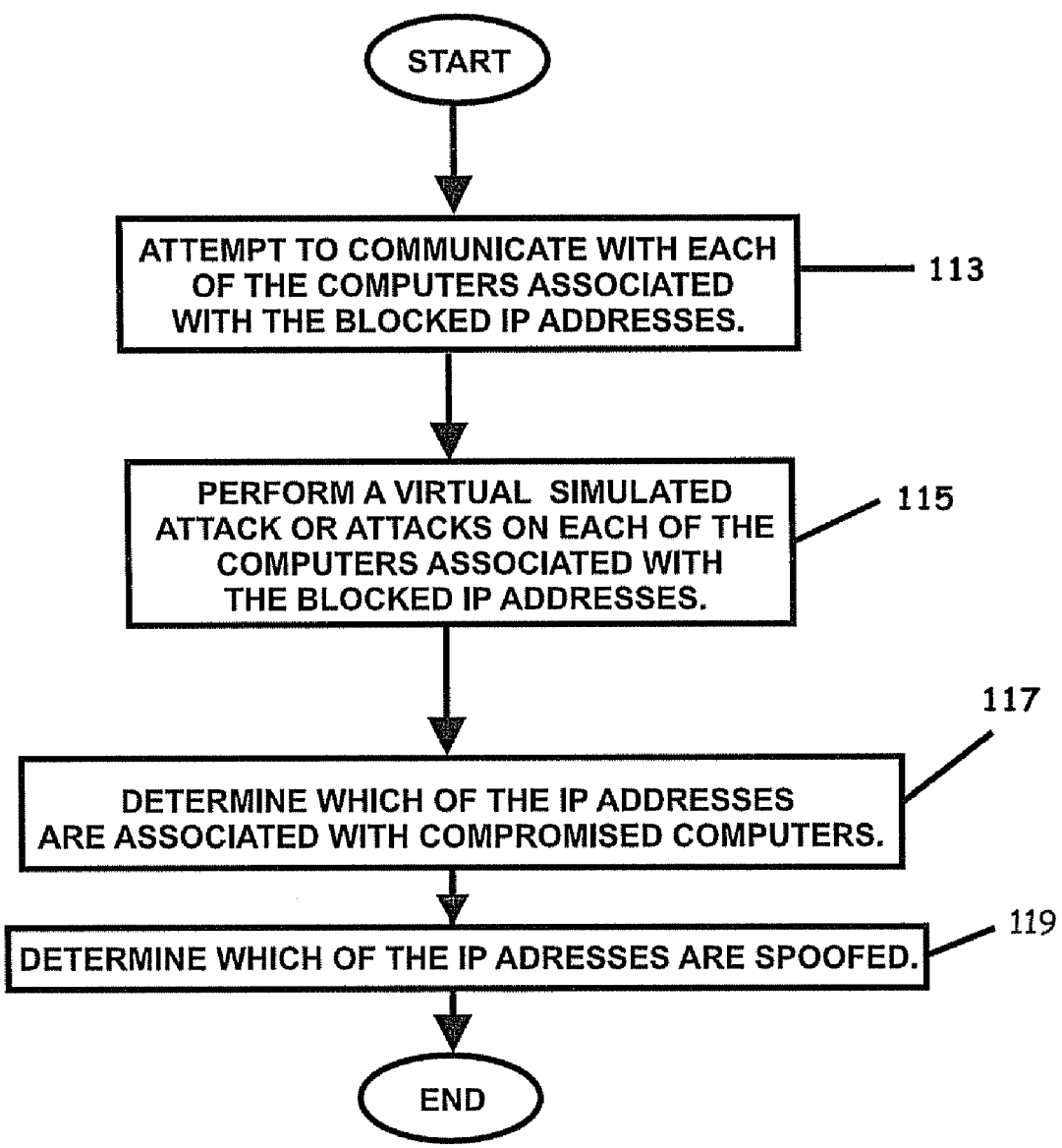
FIG. 3 is a schematic flow diagram of a method and operations of assessing the security status of a set of blocked computers or operations according to an embodiment of the present invention.

Referring to FIG. 3, the step or operation of assessing the status of a set of the blocked computers 71, 81, can include first attempting to "call back" and communicate with each of the computers 71, 81, associated with the blocked IP addresses (block 113). Beneficially, such attempted communication will allow the secondary network computer 51 (allied asset) to determine if the IP address is a legitimate IP address or a nonexistent (e.g., randomly generated) IP address. The IP address is determined to be nonexistent when no acknowledgement is received back within a "time out" period in response to a request. Accordingly, due to such "time out" period, such operations are preferably performed by a plurality of secondary computers 51 allied with the server 31.

As noted previously, if it is a legitimate IP address, it can be a compromised (i.e., vulnerable, bot controlled or readily controllable) or spoofed IP address. Accordingly, the steps/operations can also include performing at least one, but more typically a series of, virtual inert simulated attacks (visa) on each of the computers 71, 81, associated with the assigned set of blocked IP addresses (block 115) to determine which of the IP addresses are associated with compromised computers 81 (block 117).

Legitimate IP addresses may be invulnerable to a simulated attack, but may, nevertheless, represent a spoofed IP address rather than the IP address of an actual customer. Accordingly, the steps/operations can also include sending a user response request (urr) to each of the invulnerable computers 71, associated with the assigned set of blocked IP addressed to determine which of the IP addresses are associated with actual customers (block 119).

Figure 4:
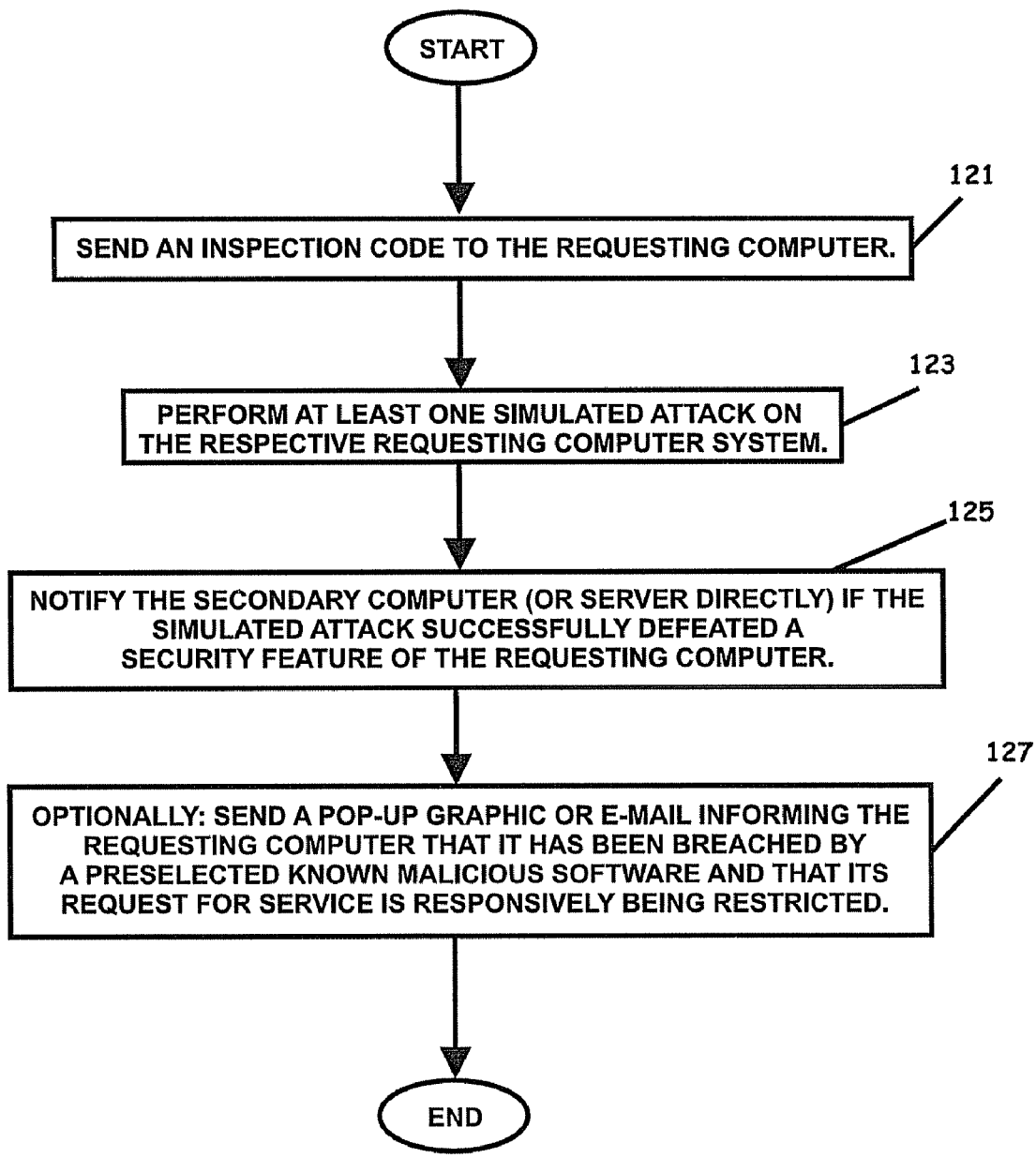
FIG. 4 is a schematic flow diagram of a method and operations of performing a virtual attack on a blocked computer according to an embodiment of the present invention.

Referring to FIG. 4, the step/operation of performing a virtual inert simulated attack or attacks can include, for example, for each secondary computer 51 allied with the server 31, the steps/operations of sending an inspection code to the requesting computer 71, 81 (block 121), and performing a virtual inert simulated attack on the respective requesting computer 71, 81 (block 123). Notably, although the inspection code can perform multiple virtual inert simulated attacks having different vulnerability assessment schemes, or more clearly stated, can contain various different types of attack code configured to assess multiple vulnerability schemes, it need only cycle through until it reaches one of the vulnerability assessment schemes which breach the security defenses of the requesting computer 71, 81.

The step/operation of performing a virtual inert simulated attack or attacks can include notifying the secondary computer 51 (or server 31, directly) if the simulated attack successfully defeated a security feature of the requesting computer 71, 81 (blocked 125). Notably, according to a preferred configuration, the virtual attack can not only identify at least one security vulnerability in the requesting computer or computer system 71, 81, but can actually demonstrate the ability to penetrate the requesting computer system's defenses. Thus, when a response is returned from a virtual simulated attack, the initiator knows, not just what kind of an attack "may" work, but what kind of attack "will" and "has" actually worked.

The step/operation of performing a virtual inert simulated attack or attacks further can include optionally sending a pop-up graphic or e-mail, for example, informing the requesting computer 71, 81, that it has been breached by a preselected known malicious software, and that its request for service is responsively being restricted, i.e., denied or limited (block 127). The pop-up graphic or e-mail can also include an identity of the malicious software vulnerability and/or an identity of a suggested patch to overcome the vulnerability. Note, the sending of a pop-up graphic or e-mail is an optional function according to the preferred configuration, as the administrator of the protected system or law enforcement may or may not want to inform the compromised computer's operator of its vulnerability. Further, sending a pop-up can be annoying to users and can utilize precious network bandwidth, which is at a premium during a denial of service attack. Thus, such step is considered to be a policy decision of implementation, not a design requirement. Nevertheless, informing the compromised computer's operator of the vulnerability, when accomplished, is generally for the purpose of gaining voluntary assistance. If there is reason to believe that the operator of the vulnerable system will not be willing to comply with either the protected system's or law enforcement's request, more extreme measures by law enforcement can be implemented, such as, for example, remotely shutting down the compromised computer or computer system, etc.

According to the preferred configuration, the virtual inert simulated attack: is not self replicating, and thus, it is not a worm or virus, nor an anti-worm or antivirus; is not broadcast across the network, but is instead directed towards known addresses, i.e., addresses of computers 71, 81, that have first requested resources from or otherwise tried to communicate with the defended/protected system during a denial of service attack, and thus, is not a mere vulnerability scan; and is not designed to do any damage to the computer or computer system 71, 81, it is analyzing; but is, instead, designed to "turn the tables" on an attacker or potential attacker, by "calling back" to a blocked IP address to allow for the determination of the level of risk in unblocking that address, thus, enabling the server 31 and/or other portions of the server computer system to initiate the communications protocol and to take positive control of the data transaction.

Figure 5:
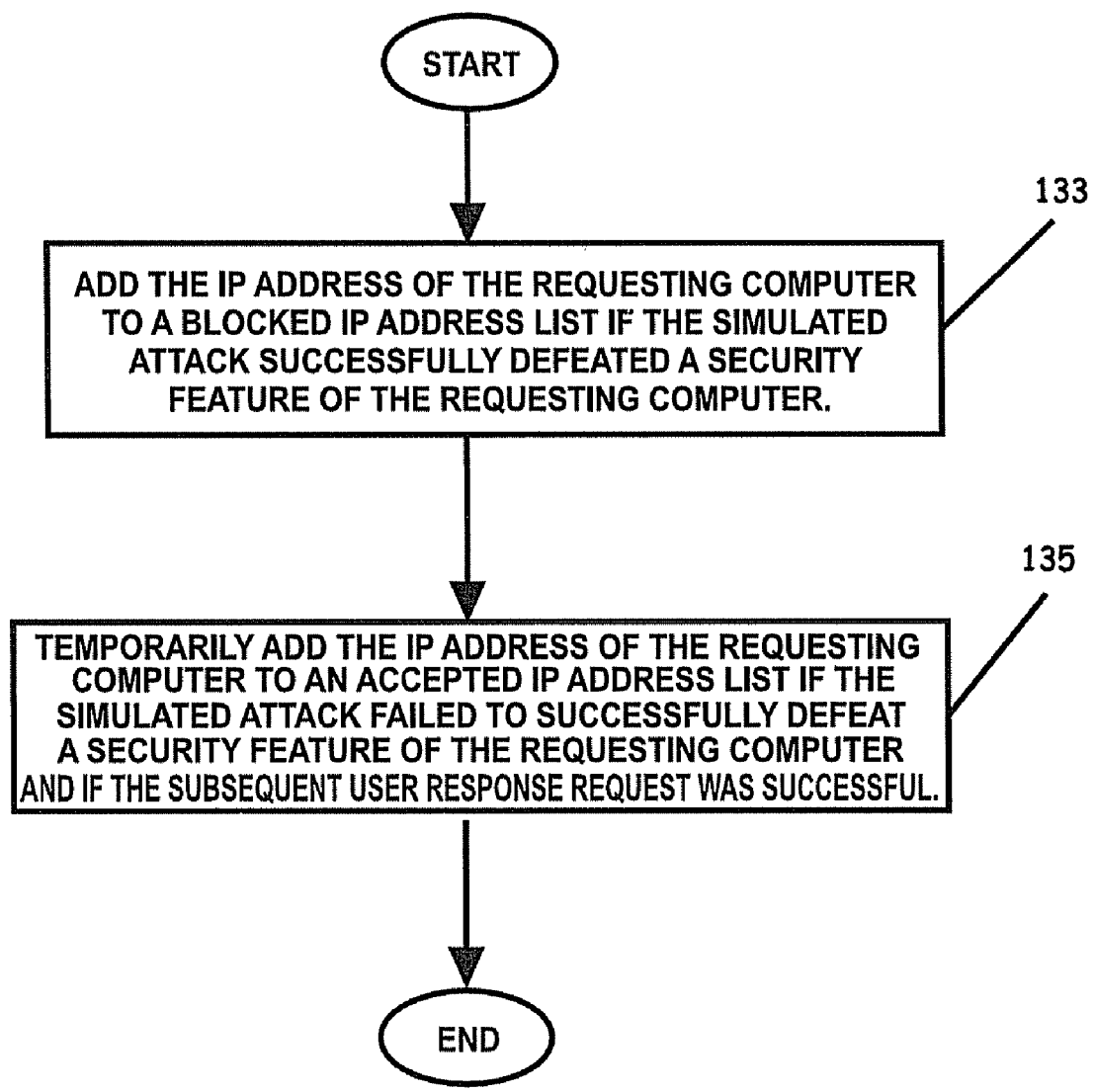
FIG. 5 is a schematic flow diagram of a method and operations of notifying a server of the communication status of each assigned set of blocked computers according to an embodiment of the present invention.

Referring again to FIG. 2, having received notification of whether or not the security of each specific assigned actual IP address is associated with a computer 71, 81, that could be readily defeated, the secondary computers 51 can notify the server 31 of the security status of the assigned set of blocked computers 71, 81 (block 131). Such notification can be direct or indirect. That is, as shown in FIG. 5, each respective secondary computer 51 can add the IP address of the requesting computer 71, 81, to a blocked IP address list 49 of the server 31 (protected system), if the simulated attack successfully defeated a security feature of the requesting computer (block 133), or if the simulated attack was unable to successfully defeat a security feature of the requesting computer 71, and the subsequent user response request was successful, temporarily add the IP address of the requesting computer 71 to an accepted IP address list 47 of the server 31 (block 135).

Referring again to FIG. 2, responsive to the blocked address list 49 and/or the accepted IP address list 47, the steps/operations can further include temporarily resuming providing service to the computers (users) 71 associated with the "originally" or "initially" blocked IP addresses that were found invulnerable to the virtual inert simulated attack and for which a user response request was successful (block 141), while restricting, e.g., limiting or denying, provision of services to the vulnerable requesting computers 81 (block 143). Note, IP addresses added to the accepted IP address list 47 should continue to be monitored against an appropriate user profile to ensure that such an IP address does not begin to exceed normal protected system resources. As the denial of service attack subsides and the protected computer/computer system resources become available, vulnerable IP addresses may be temporarily added onto the accepted IP address list 47.

Figure 6:
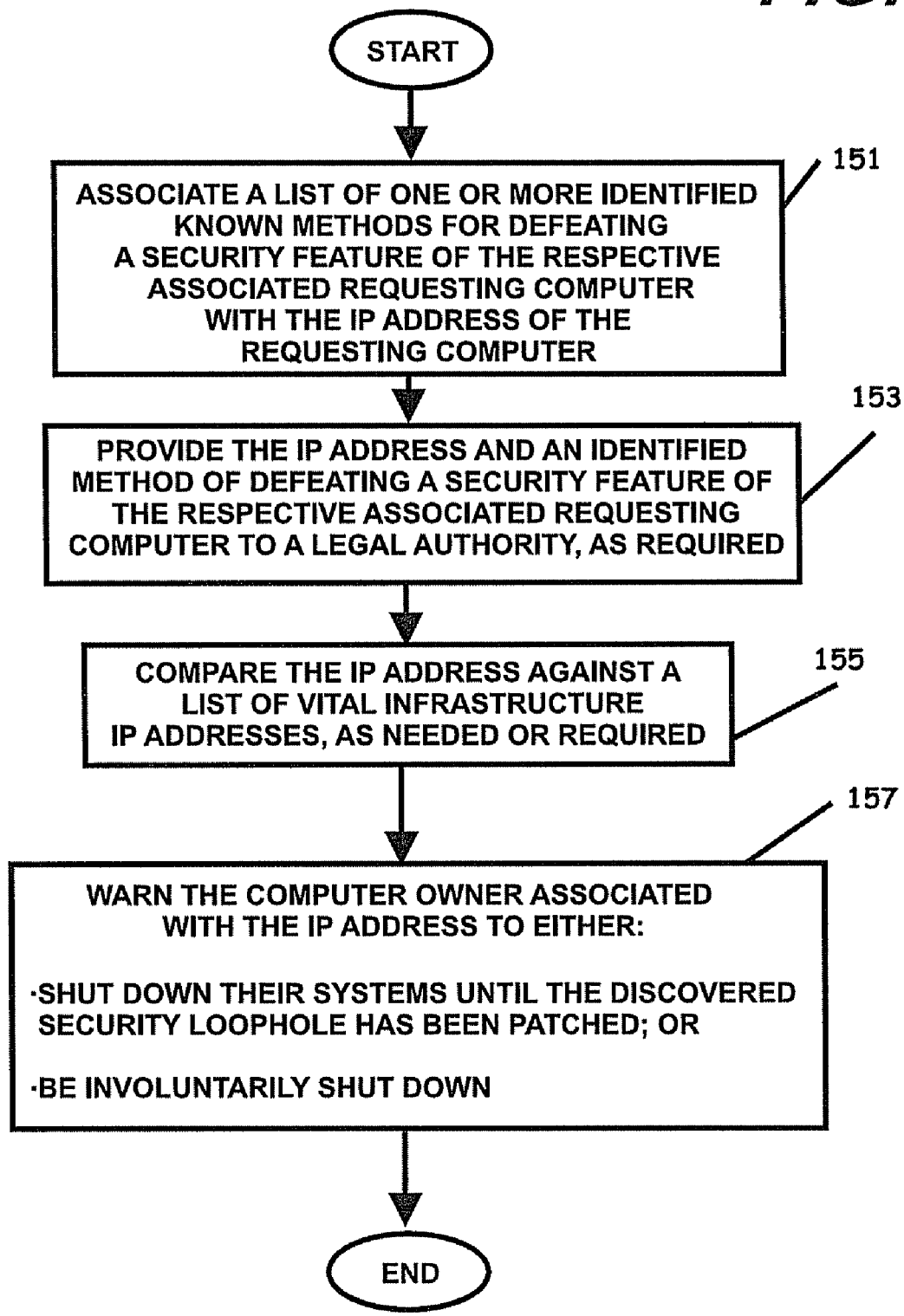
FIG. 6 is a schematic flow diagram of a method and operations of preparing legal authorities for instituting a counterattack on a compromised computer according to an embodiment of the present invention.

Referring to FIG. 6, for each of the blocked IP addresses failing the security check, i.e., those at least "initially" temporarily added to the blocked IP address list 49, the steps/operations can include associating a list of one or more identified known methods for defeating a security feature of the compromised associated requesting computer 81 (block 151), providing the IP address and an identified method of defeating a security feature of each compromised associated requesting computer 81, to a legal authority (block 153), comparing each received IP address against a list of vital infrastructure IP addresses (block 155), warning the computer operator associated with each respective received IP address to either: voluntarily shut down their systems until the discovered security loophole has been patched (as they have been identified as at least passive, but more likely active participants in an on going denial of service attack), or be involuntarily shut down. That is, if the respective computer system owners do not voluntarily comply within a specific time period, legal authorities could remotely shut these systems down, for example, by launching a counterattack against the computer system, e.g., using the determined vulnerability scheme associated with the virtual attack. As such, after a preselected amount of time, a determination is made on whether or not the computer system operators have voluntary shutdown their systems. If not, legal authorities could perform a targeted counterattack on the respective associated requesting computer 81 to thereby suppress the denial of service attack on the server 31.

At the time of a denial of service attack, there can be two kinds of potential customers: (1) previous customers who have had business with the protected system 30—whose IP address can be stored; and (2) new customers who have not had business with the protected system 30 prior to a denial of service attack. Various embodiments of the present invention's program product, and related methods address the "new customer" class by (a) "calling back" the IP address; (b) inertly attacking its security scheme; and (c) if successful, (i) identifying the tested system as being vulnerable, (ii) identifying what type of attack was successful, and (iii) listing the IP address on a block list 49, or (d) if unsuccessful, (i) sending a user response request to the invulnerable IP address via a pop-up template, email or similar message known to those skilled in the art, requesting the current computer operator to acknowledge submitting the previous request for services from the protected computer/computer system, and if the operator's response is affirmative, (ii) listing the IP address on a temporary "acceptance" IP address list 47, thus, allowing a previously unknown or new customer to access the protected system's services during a denial of service attack in a controlled manner.

Embodiments of the present invention include provisions for enhanced service to "previous" customers who have had previous communications/business with the protected system 30, which allow them access to the protected system 30 during a denial of service attack, by granting previous customer IP addresses first call back (priority) status and by extending the user response request, which can defeat the "spoofed" IP address problem to include a "pre-attack" agreed upon protocol.

Figure 7:
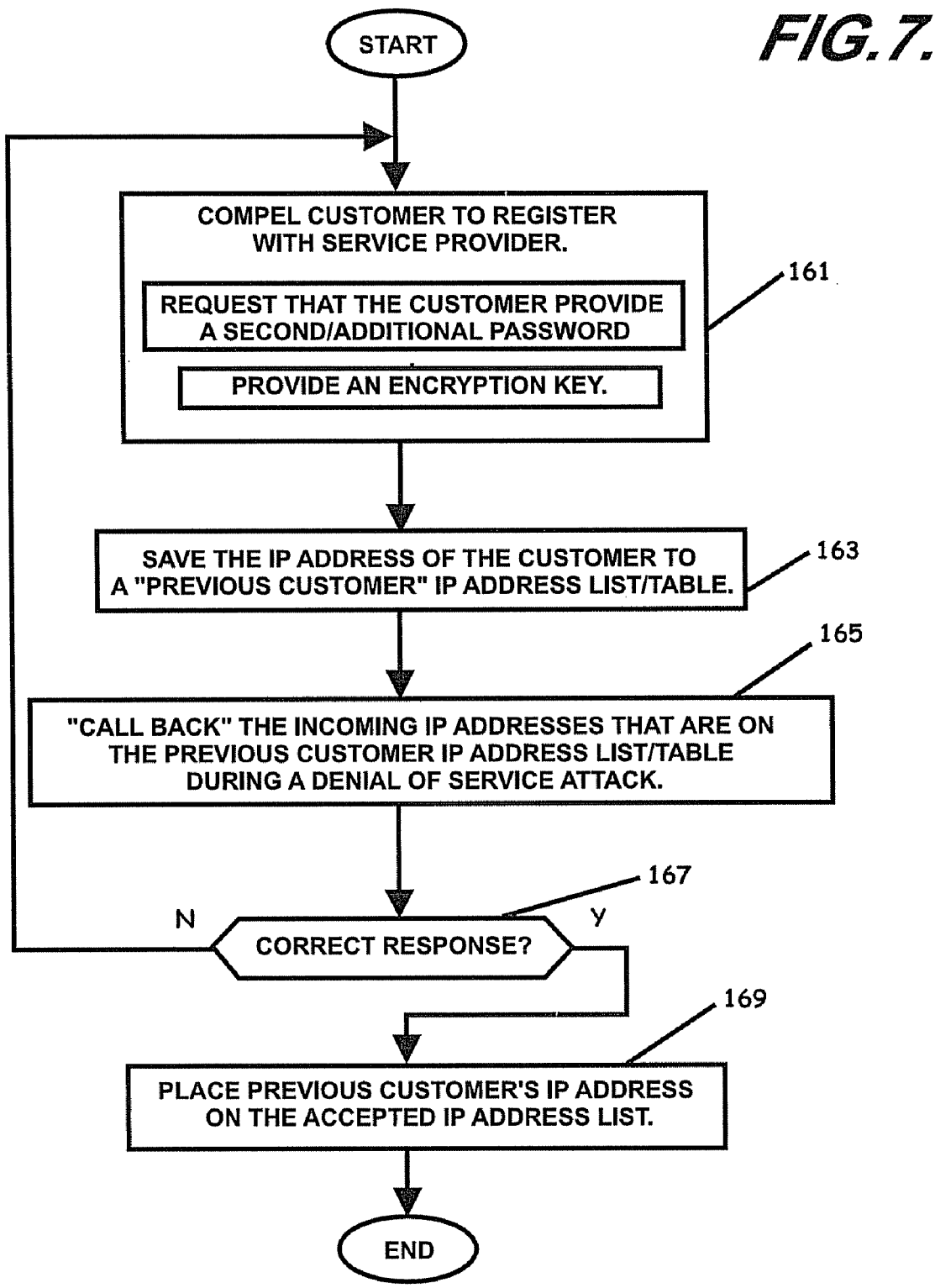
FIG. 7 is a schematic flow diagram of a method and operations for security and dynamic risk assessment and management according to an embodiment of the present invention.

As perhaps best shown in FIG. 7, for example, prior to any denial of service attack, all customers requesting services from the server 31 can be compelled to register with the associated service provider (block 161). During this registration process, the service provider can request that the customer provide a second or an additional password to the usual password for accessing the customer's account on the server 31 during a denial of service attack, and can provide an encryption key. The IP address of this "previous" customer can then be saved to a "previous customer" IP address list/table (not shown) for later access (block 163) and comparison against incoming service requests.

During a denial of service attack, the server 31 and/or its allied asset or assets (e.g., secondary computer 51) can prioritize the "call backs" to those recorded incoming IP addresses that match an address on the previous customer IP address list (block 165). A standard user response request message including "human-in-the-loop" authentication such as response templates and/or CAPTCHA etc. can be sent. For previous customers, however, the user response can also include a pre-agreed upon encrypted password/message etc. Only the original customer will know how to decrypt the password/message. Thus, the customer can be sure that the service provider, and no one else sent the message. The previous customer then fills in the CAPTCHA or other security template in response to the "call back" from the server 31 or its allied secondary computer 51. This identifies to the server 31 or the secondary computer 51 whether or not the customer has or has not requested services from the protected system 30 and proves that a "human" is responding to the request. If the response is correct (block 167), the previous customer's IP address is placed on the protected systems accepted IP address list 47 (block 169) and the customer can then re-request services. Note, such a pre-agreed upon call back protocol can be used to further secure communications under normal, i.e., non-attack conditions.

Note: it is expected that any "spoofed" IP address that receives the "call back" will likely not respond or just opt out of the authentication process (i.e., send a negative reply), as the spoofed system's operator has not requested services. Thus, this procedure can be used to effectively identify "spoofed" IP addresses during a denial of service attack.

It is important to note that while embodiments of the present invention have been described in the context of a fully functional system, those skilled in the art will appreciate that the mechanism of at least portions of the present invention and/or aspects thereof are capable of being distributed in the form of a computer readable medium storing instructions in a variety of forms for execution on a processor, processors, or the like, and that embodiments of the present invention apply equally regardless of the particular type of signal bearing media used to actually carry out the distribution. Examples of computer readable media include, but are not limited to: nonvolatile, hard-coded type media such as read only memories (ROMs), CD-ROMs, and DVD-ROMs, or erasable, electrically programmable read only memories (EEPROMs), recordable type media such as floppy disks, hard disk drives, CD-R/RWs, DVD-RAMs, DVD-R/RWs, DVD+R/RWs, HD-DVDs, memory sticks, mini disks, laser disks, Blu-ray disks, flash drives, and other newer types of memories, and transmission type media such as, for example, digital and analog communication links capable of storing the instructions. Such media can include, for example, both operating instructions and operations instructions related to the program product 91 and the method steps/operations, described above.

Accordingly, an embodiment of the present invention can include a computer readable medium that is readable by a computer, e.g., server 31. The computer readable medium can include a set of instructions (e.g., a server portion of program product 91 and/or above described method steps/operations in computer readable form) that, when executed by the server 31, cause the server 31 to perform the operations of: determining the existence of a denial service or other such attack on the server 31; blocking the IP addresses of computers 71, 81, attempting to communicate with the server 31 during the attack; and initiating a virtual inert simulated attack or attacks on each of the computers 71, 81, followed by a user response request to uncompromised computers 71 associated with the initially temporarily blocked IP addresses to determine which of the IP addresses are associated with compromised computers 81 and/or spoofed IP addresses of uncompromised computers 71. The virtual attack or attacks can be initiated by transmitting or otherwise sending an inspection code directly to each of the computers 71, 81 associated with the blocked IP addresses, or more preferably, by providing a subset of the blocked IP addresses to at least one, but preferably a plurality of, allied secondary network computers 51 configured to "call back" and communicate with the assigned computers 71, 81. Note, if a plurality of secondary network computers 51 is utilized, the initial blocked IP address list can be divided, e.g., somewhat equally, or according to some other methodology, to equitably distribute the workload in contacting each of the blocked computers 71, 81 among the secondary network computers 51. The secondary computers 51 can then send the inspection codes followed by a user response request to their respective sets of blocked IP addresses, excluding, for example, those deemed to be nonexistent as a result of the "call back" function. Lists of blocked IP addresses 49 and accepted IP addresses 47 can be separately developed by each computer 51 and transmitted directly to the server 31 for consolidation into a master blocked IP address list 49 and "temporarily" accepted IP address list 47.

Specifically, assuming the simulated inert virtual attack or attacks and user response requests are launched from the secondary network computers 51, the operations can also include receiving from the secondary network computers 51, the list of blocked/restricted IP addresses 49 and/or the accepted IP addresses 47 formed responsive to the virtual attacks. Alternatively, if the attacks were launched directly from the server 31, the server 31 can compile and store the lists 47, 49, itself. Regardless, the operations can also include resuming providing service to the computers (users) 71 associated with the originally temporarily blocked IP addresses that were found invulnerable to the virtual simulated attack and providing a user response upon request, i.e., those placed at least temporarily on the accepted IP address list 47. Further, to enhance the provision of services, the server 31 can continue to block those on the blocked/restricted IP address list 49.

An embodiment of the present invention can also include a computer readable medium that is readable by a computer, e.g., each separate one of the secondary network computers 51. The computer readable medium can include a set of instructions (e.g., a client portion of program product 91 and/or above described method steps/operations in computer readable form) that, when executed by each separate respective secondary computer 51, cause the computer 51 to individually perform the operations of receiving indicia or otherwise detecting/determining that the server 31 is facing a denial of service or other type of attack and/or instructions to launch a virtual simulated attack on a set of computers 71, 81 followed by sending user response requests, attempting to communicate with the server 31 during the denial of service attack. Correspondingly, the operations can also include receiving a set of blocked IP addresses, for example, over a dedicated intercommunication port(s), to perform the virtual simulated attack or attacks, etc., thereon. Notably, if a plurality of secondary computers 51 are used in order to distribute resource utilization, the received set of blocked IP addresses can be a portion thereof distributed according to a distribution methodology known to those skilled in the art. The operations can also include each individual secondary network computer 51 attempting to "call back" and communicate with each of the computers 71, 81 in the assigned set of computers 71, 81, associated with its respective set of the blocked IP addresses; and through attempted direct communication with each computer 71, 81, of the assigned set of computers 71, 81, determining which of its assigned IP addresses are nonexistent IP addresses. The operations can also include determining which of the IP addresses are vulnerable service requesting IP addresses. This can be done by sending an inspection code to perform a virtual simulated attack or attacks on each of the assigned computers 71, 81, to determine which of the IP addresses are associated with compromised computers; and for invulnerable computers 71, sending a user response request to identify spoofed IP addresses. The operations can also include each separate secondary computer 51 receiving a notification from the inspection code sent to its respective assigned set of IP addresses, each indicating if the associated simulated attack successfully defeated a security feature of the respective attacked computer 71, 81. The operations can further include assembling one or more lists indicating accepted IP addresses or indicating IP addresses that should remain blocked or restricted, and notifying the server 31 storing the list or lists 47, 49, to provide ready access to and by server 31.

Embodiments of the present invention provide several advantages. Most notably, embodiments of the present invention can provide an offensive approach to defeating various types of attacks such as, denial of service attacks, and the like. Such approach advantageously allows a defended/protected computer or computer system to distribute work onto the requesting machines, while reducing the defended computer system's workload. Such approach is advantageously also scalable, in that it can incorporate a readily updatable library of attack codes. Further, it can generally follow a reactive scheme, allowing periodic updating to adapt to new forms of malware, etc., with only the vulnerability exploitation scheme needing to be duplicated, not each virus or virus revision. Advantageously, such approach can also be considered a "preventative" strategy. Such approach can disable address chaining/spoofing through the use of "human-in-the-loop" request verification, making it much more difficult for an attacker or group of attackers to hide the source of an attack. Further, advantageously, such approach/strategy is not dependent upon matching, code, IP addresses, or domain names, etc. Still further, such approach can allow responses to individual requests to be made upon a prioritized basis. Those systems that are most vulnerable can be provided the lowest priority in being served so that during a denial of service or other similar attack, only the most secure systems would be serviced.

This scheme advantageously recognizes that compromised systems make up the bulk of a denial of service attack. Thus, such approach allows for matching and countering the attacking strategy, exactly. This will allow the vast majority of legitimate requests to be serviced with little or no interruption, thus, defeating the attack. The only delay is in the initial response to the service request requiring the customer to verify the original request for service, after which the pre-attack service response remains the same both from a user and security point of view. Additionally, this approach can qualify the requesting system independently, online, as requests are received, including during an attack, and can adjust itself for the changing status of the requesting systems, automatically.

As noted above, advantageously, according to embodiments of the present invention, the strategy for identifying compromised requesting computers need only provide a method of determining the vulnerability to exploitation and not the specific virus to which the requesting computer/system is vulnerable. Once the vulnerability determination is made, either through a vulnerability scan, but preferably through an actual security breach directed to the requesting user's computer, there are several options: According to an embodiment of the invention, an inspection code could send a pop-up, e-mail, or similar message informing the requesting computer/system of the vulnerability and/or identifying the specific vulnerability and/or the patches needed to be installed. Advantageously, the protected computer/system could either completely restrict access by the requesting computer/system (i.e., provide no service), or could prioritize access according to the vulnerability so that during a denial of service attack, machines that are most vulnerable (most likely to be compromised) are provided the lowest priority in being served. Advantageously, this can allow the most secure systems uninterrupted service, resulting in the vast majority of legitimate requests for service to be served without interruption. Further, advantageously, a possible measure is to present a warning to the requesting user computer telling the requester user to either shut down the computer voluntarily, i.e., for a specified period or until the security vulnerability is corrected, or face involuntarily shut down. Other contingencies are, of course, within the scope of the present invention.

Embodiments of the present invention can advantageously provide a series of sequenced tests which allow a defended system to identify legitimate customers during a denial of service attack. According to a preferred embodiment of the present invention, during operations, the system and methods can monitor/filter incoming service requests against a user profile, initially/temporarily blocking all IP addresses when a denial of service attack is identified. The system and methods can then call back the computers associated with the initially blocked IP addresses, preferably beginning with any previous customers. Advantageously, this test can provide an "existence" test. Note, previous customer IP addresses should naturally pass this test. The system and methods can then initiate a virtual inert simulated attack against the existing IP addresses. Advantageously, this test can test for vulnerability and return successful modes of attack. For invulnerable computers/systems, the system and methods can send a user response request requesting a human to respond. Advantageously, this test can provide a "spoof" test and can definitively identify actual current customers, whether new or previous. A positive response confirms that the original service request that resulted in the blocking of the IP address of the requester, was from an actual customer. Further, if performed in the above order, maximum efficiency is enhanced. For example, the virtual simulated attack can help ensure the feasibility of the spoof test. Without first eliminating the vulnerable computers, the resources needed to request a human response may be excessive due to a time out scenario.

In the drawings and specification, there have been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification. For example, although server 31 was identified as the defended computer, any computer on or a part of the protected system can employ the functionality of the various embodiments of the present invention. Also for example, this invention embodiment or "call back authentication" scheme may allow the substitution of a simple vulnerability scan for the virtual inert simulated attack, which can be well suited for other applications not requiring counter attack information, such as those in the banking industry, or any other network requiring a higher level of secure communications. That is, the "call back authentication" scheme, according to various embodiments of the present invention, need not be used only during a denial of service attack.

That claimed is:

1. A method of identifying and servicing customer requests to a defended network computer on a defended network, the method comprising the steps of:
receiving a service request from a service requesting computer by the defended network computer over a communications channel, the service requesting computer having an associated IP address;
sending an inspection code to the service requesting computer at the associated IP address, the inspection code adapted to perform a simulated attack on the respective service requesting computer system and to notify the defended network computer or a secondary network computer associated therewith that the simulated attack successfully defeated a security feature of the service requesting computer when so occurring; and
restricting provision of services to the service requesting computer from the defended network computer responsive to determining that a security feature of the service requesting computer has been defeated by the simulated attack.

2. The method as defined in claim 1, further comprising the steps of:
   initially blocking the service request by disconnecting the communication channel; and
   reestablishing communications with the service requesting computer prior to the step of sending the inspection code, the reestablishing communications performed by calling back the IP address of the service requesting computer.

3. The method as defined in claim 1, further comprising the steps of:
   performing the simulated attack on the service requesting computer; and
   sending notification to the defended network computer or associated secondary network computer that the simulated attack successfully defeated a security feature of the service requesting computer.

4. The method as defined in claim 3, further comprising the step of sending a pop-up graphic or e-mail informing an operator of the service requesting computer that the service requesting computer is vulnerable to a specific type of malicious software code and that its request for service is responsively being restricted.

5. The method as defined in claim 3, wherein the step of performing a simulated attack includes employing a plurality of different types of attacked codes on the service requesting computer, each different type of attack code having a different category of vulnerability exploitation scheme than that of each other attack code of the plurality of different types of attack codes.

6. The method as defined in claim 1, further comprising the step of creating the inspection code from a preselected known malicious software, rendered inert, and at least one other malware code including a known back-door entry code.

7. The method as defined in claim 1, further comprising the step of:
   sending a user response request to the service requesting computer at an associated IP address when the simulated attack failed to successfully defeat each tested security feature of the service requesting computer; and wherein the step of restricting provision of services to the service requesting computer from the defended network computer is further responsive to the service requesting computer failing to respond affirmatively to the user response request.

8. The method as defined in claim 7, further comprising the steps of:
   determining an existence of a denial of service attack on the defended network computer responsive to at least one denial of service identification scheme;
   blocking the IP address of the service requesting computer responsive to determining the existence of the denial of service attack; and
   resuming service to the service requesting computer during the denial of service attack while simultaneously maintaining a block on a plurality of other IP addresses when it is determined that the simulated attack failed to successfully defeat a security feature of the service requesting computer and an affirmative response was received from the service requesting computer responsive to the user response request.

9. The method as defined in claim 7, further comprising the steps of:
   sending the IP address of the service requesting computer to the secondary network computer by the defended network computer responsive to receiving the respective service request; and
   reestablishing communications with the service requesting computer prior to the step of sending the inspection code; and wherein
   the steps of reestablishing communications, sending the inspection code to the service requesting computer, and sending the user response request are performed by the secondary network computer.

10. The method as defined in claim 1, further comprising the steps of:
    determining an existence of a denial of service attack on the defended network computer responsive to at least one denial of service identification scheme;
    blocking the IP address of the service requesting computer responsive to determining the existence of the denial of service attack to disconnect the communication channel with the service requesting computer;
    calling back the IP address to reestablish communications with the service requesting computer;
    sending an inspection code to perform a simulated attack on the service requesting computer;
    receiving data from the inspection code indicating that the simulated attack successfully defeated a security feature of the service requesting computer when a security feature was successfully defeated by the simulated attack;
    sending a user response request to determine that a "human" is in the loop when each tested security feature was not successfully defeated by the simulated attack; and
    adding the IP address of the service requesting computer to a blocked IP address list, the step performed by one of the following: the defended network computer and the secondary network computer, responsive to one of the following:
      receiving the data indicating that the simulated attack successfully defeated a security feature of the service requesting computer, and
      receiving a negative response or no response to the user response request.

11. A method of identifying and servicing real customer requests to a defended computer, the method comprising the steps of:
    receiving by the defended computer, a plurality of service requests from a corresponding plurality of IP addresses each associated with a separate one of a plurality of service requesting computers;
    blocking each service request by disconnecting communications between the defended computer and each of the plurality of service requesting computers;
    reestablishing communications with each of a plurality of service requesting computers by calling back the respective IP address of each separate one of the plurality of service requesting computers;
    sending an inspection code to each separate one of the plurality of service requesting computers at each respective associated IP address, the inspection code adapted to perform a virtual simulated attack on the respective service requesting computer; and
    restricting provision of services from the defended computer to a subset of the plurality of service requesting computers, each respective service requesting computer of the subset of the plurality of service requesting computers identified for restriction when a security feature of the respective service requesting computer is determined to have been defeated by the virtual simulated attack.

12. The method as defined in claim 11, further comprising the steps of:
   determining an existence of a denial of service attack on the defended computer responsive to at least one denial of service identification scheme;
   performing the step of blocking each of the plurality of IP addresses responsive to receiving the respective service request from the each separate one of the plurality of service requesting computers during the denial of service attack, the plurality of blocked IP addresses including a plurality of actual potential customer IP addresses, a plurality of spoofed IP addresses, a plurality of robot program IP addresses, and a plurality of nonexistent IP addresses;
   performing the virtual simulated attack separately on each of the plurality of blocked IP addresses to identify a subset of the plurality of IP addresses associated with a corresponding plurality of substantially protected service requesting computers;
   sending a user response request to the identified subset of the plurality of IP addresses to thereby identify spoofed IP addresses contained therein; and
   resuming service to each IP address of the identified subset of the plurality of IP addresses affirmatively responding to the user response request during the denial of service attack while simultaneously maintaining a block on the plurality of robot program, nonexistent, and spoofed IP addresses.

13. The method as defined in claim 12, wherein the step of performing a virtual simulated attack includes employing a set of at least two different types of attack codes on at least one of the service requesting computers, each attack code in the set of attack codes being associated with a different category of vulnerability exploitation scheme than that of each other attack code in the set of attack codes.

14. The method as defined in claim 12, further comprising the step of creating the inspection code from a successful original malicious software code, rendered inert.

15. The method as defined in claim 11, further comprising performing the following steps on each of the plurality of service requesting computers:
   performing a virtual simulated attack directed to the respective associated IP address to determine if a security feature of the respective service requesting computer can be defeated by a preselected known malicious software; and
   sending notification to the defended computer or associated secondary computer in communication therewith that the security feature of the respective service requesting computer has been successfully defeated by the preselected known malicious software when determined to be defeated.

16. The method as defined in claim 11, further comprising the steps of:
   sending a user response request to each separate one of the plurality of service requesting computers at each respective associated IP address that has been determined invulnerable to the inspection code sent thereto; and wherein
   the step of restricting provision of services from the defended computer to a subset of the plurality of service requesting computers further includes identifying a requesting computer for restriction responsive to receiving from the respective requesting computer either a negative response or no response to the user response request.

17. The method as defined in claim 11, further comprising the step of:
   sending by the defended computer, the IP address of each separate one of the plurality of service requesting computers to a secondary network computer associated with the defended computer, and wherein
   the step of sending an inspection code to each separate one of the plurality of service requesting computers and the step of sending a user response request to each separate one of the plurality of service requesting computers at each respective associated IP address that has been determined invulnerable to the inspection code sent thereto are performed by the secondary network computer to thereby reduce resource utilization requirements for the defended computer.

18. A method of identifying and servicing actual legitimate customer requests while simultaneously blocking communications with service requesting computers having nonexistent or spoofed IP addresses and service requesting computers associated with robot program service requests during a denial of service attack on a defended computer, the method comprising the steps of:
   determining an existence of a denial of service attack on the defended computer responsive to a denial of service identification scheme responsive to customer behavior profiling;
   blocking each of the plurality of IP addresses initially responsive to determining the existence of the denial of service attack;
   attempting to reestablish communications with each of the plurality of initially blocked IP addresses by calling the respective IP address back thereby establishing an existence or nonexistence of each of the plurality of initially blocked IP addresses;
   performing a virtual simulated attack separately directed to each of the plurality of initially blocked IP addresses responding to the call back to thereby identify a subset of the plurality of IP addresses each associated with a separate one of a plurality of substantially protected computers;
   sending a user response request to each IP address of the identified subset of the plurality of substantially protected service requesting computers to thereby identify a plurality of actual customer IP addresses associated with a corresponding plurality of the substantially protected actual customer service requesting computers; and
   resuming service to the plurality of actual customer IP addresses during the denial of service attack while simultaneously maintaining a block on each IP address associated with a not substantially protected computer and maintaining a block on each spoofed IP address.

19. The method as defined in claim 18, further comprising the steps of:
   sending indicia of the plurality of initially blocked IP addresses by the defended computer to a secondary computer associated therewith responsive to receiving the respective service request from the each of the plurality of IP addresses, wherein
   the step of performing a virtual simulated attack includes the associated secondary computer sending an inspection code to each separate one of the plurality of IP addresses to thereby reduce resource utilization requirements for the defended computer; and wherein the step of sending a user response request to each IP address of the identified subset of the plurality of substantially protected service requesting computers includes the associated secondary computer sending the respective user response request to each IP address of the identified subset of the plurality of substantially protected service requesting computers.

20. The method as defined in claim 18, further comprising the step of:

creating the virtual attack from a successful original malicious software code rendered inert to thereby identify each of the plurality of initially blocked IP addresses associated with a corresponding service requesting computer that has not been patched in response to public identification of an existence of the original malicious software code.

21. The method as defined in claim 20, wherein the step of performing a virtual attack includes:

employing a set of at least two different types of attack codes on at least one of the plurality of initially blocked IP addresses, each attack code in the set of attack codes being associated with a different category of vulnerability exploitation scheme than that of each other attack code in the set of attack codes.

22. The method as defined in claim 18, further comprising the defended computer or an associated secondary computer in communication therewith, performing the steps of:

receiving, for each of the plurality of initially blocked IP addresses, data indicating a security feature of a respective service requesting computer associated with the respective one of the plurality of initially blocked IP addresses was either successfully or not-successfully defeated by the respective virtual simulated attack defining a respective security determination; and adding each separate one of the plurality of initially blocked IP addresses to either an accepted IP address list or a blocked IP address list responsive to the respective security determination and responsive to results of the respective user response request to thereby allow the plurality of substantially protected computers affirmatively responding to the respective user response request to resume substantially normal communication with the defended computer.

23. The method as defined in claim 22, wherein the step of adding each separate one of the plurality of initially blocked IP addresses to either an accepted IP address list or a blocked IP address list includes the step of adding each separate one of a subset of the plurality of initially blocked IP addresses to the blocked IP address list responsive to one or more of the following:

determining the respective service requesting computer associated with the respective IP address to be added to the blocked IP address list to have a security feature successfully defeated by the respective virtual simulated attack, and receiving no response or a negative response to the user request sent to the respective substantially protected service requesting computer associated with the respective IP address to be added to the blocked IP address list; and wherein the method further comprises the step of:

associating for each of the IP addresses associated with an insecure service requesting computer, and added to the blocked IP address list, a list of one or more identified known methods for defeating a security feature of the respective associated service requesting computer.

24. The method as defined in claim 23, further comprising for each of the IP addresses associated with an insecure service requesting computer and added to the blocked IP address list, the step of:

providing to a legal authority the IP address and an identified method of defeating a security feature of the respective associated service requesting computer to enable the legal authority to perform a targeted counterattack on the respective associated service requesting computer to thereby suppress the denial of service attack on the defended computer.

25. Security and dynamic risk assessment and management program product stored in a non-transitory computer readable storage medium to provide dynamic risk assessment and management, the program product including instructions that when executed by a defended computer, cause the defended computer to perform the operations of:

blocking IP addresses of each separate one of a plurality of communication requesting computers attempting to communicate with the defended computer during a denial of service type attack;

initiating a virtual attack on each of the plurality of communication requesting computers to determine if the respective communication requesting computer can be compromised by a malicious software code associated with the virtual attack;

sending a user response request to each of the plurality of communication requesting computers found to be invulnerable to each of one or more vulnerability schemes associated with the virtual attack to thereby determine if each respective invulnerable communication requesting computer has a "human-in-the-loop"; and allowing resumption of communications with each of a subset of the plurality of communication requesting computers found to be invulnerable to each of one or more vulnerability scheme associated with the virtual attack and that returned an affirmative response to the respective user response request.

26. Program product as defined in claim 25, wherein the subset of the plurality of communication requesting computers is a first subset, and wherein the operation of allowing the resumption of communications includes the operation of:

restricting provision of communications from the defended computer to a second subset of the plurality of communication requesting computers identified for restriction during the denial of service type attack, each communication requesting computer of the second subset of the plurality of communication requesting computers identified for restriction when either a security feature of the respective communication requesting computer is determined to have been defeated by any one of the one or more vulnerability schemes associated with the virtual attack or when the respective communication requesting computer provided a negative response or no response to the respective user response request provided thereto.

27. Program product as defined in claim 25, wherein the virtual attack is initiated for each respective one of the plurality of communication requesting computers by sending a separate copy of an inspection code directly to the respective communication requesting computer; and wherein the respective user response request sent to each of the plurality of communication requesting computers found to be invulnerable to each of one or more vulnerability scheme associated with the virtual attack is sent directly to each separate one of a subset of invulnerable communication requesting computers by a corresponding separate copy of user response request code.

28. Program product as defined in claim 27, wherein the virtual attack. the user response request, or both are further initiated by assigning a different subset of the IP addresses of each of the plurality of communication requesting computers to each of a plurality of secondary network computers in communication with the defended computer and adapted to communicate with each communication requesting computer associated with the respective subset of blocked IP addresses.

29. Program product as defined in claim 28, wherein each of the plurality of secondary network computers assemble at least one of the following:
   a list of restricted IP addresses associated with one or more of the communication requesting computers having at least one security feature breached by the respective virtual attack or a negative response or no user request response, and
   a list of accepted IP addresses associated with one or more of the communication requesting computers determined invulnerable to each of one or more vulnerability schemes associated with the virtual attack and having sent an affirmative response to an associated user response request.

30. Program product as defined in claim 25, the operations further comprising:
   receiving at least one of the following: a list of restricted IP addresses and a list of accepted IP addresses, the respective list or lists formed responsive to completion of the respective virtual attack on each separate one of the plurality of communication requesting computers and responsive to results of a user request response provided to each separate one of the plurality of invulnerable communication requesting computers.

31. Security and dynamic risk assessment and management program product stored in a non-transitory computer readable storage medium to provide dynamic risk assessment and management, the program product including instructions that when executed by a secondary network computer, cause the secondary network computer to perform the operations of:
   receiving, by the secondary network computer, one or more of the following: indicia that a network defended server is encountering a denial of service type attack, and instructions to initiate a virtual attack on a plurality of communication requesting computers associated with a set of a corresponding plurality of initially blocked IP addresses;
   attempting to communicate with each of the plurality of communication requesting computers associated with the set of the plurality of blocked IP addresses to eliminate nonexistent IP addresses from the set of initially blocked IP addresses, to thereby form a significantly reduced set of computer IP addresses to further analyze;
   sending a separate copy of an inspection code to each communication requesting computer associated with one of the reduced set of computer IP addresses, the inspection code adapted to perform the virtual attack on the respective associated communication requesting computer;
   receiving a notification from each respective inspection code indicating that the virtual attack successfully defeated a security feature of the respective attacked communication requesting computer defining a respective compromised communication requesting computer, or that the virtual attack failed to defeat each tested security feature of the respective attacked communication requesting computer defining a respective non-compromised communication requesting computer;
   sending a user response request to each non-compromised communication requesting computer;
   receiving either a confirmation of an original service request or a denial of any such service request, or timing out when no response to the respective user response request was received: and
   assembling one or more lists indicating one or more of the following:
      accepted IP addresses of attacked communication requesting computers found to be invulnerable to the virtual attack and which returned a human actuated confirmation of an original service request, and
   restricted IP addresses of attacked communication requesting computers that should remain blocked or restricted as being found to be actually vulnerable to at least one vulnerability scheme provided in the respective virtual attack or found to be an actual spoofed IP address providing a negative response or no response to the respective user response request provided thereto, the one or more lists being usable by the defended server to allow resumption of communication with each of the computers having an IP address on the accepted IP addresses list, while simultaneously restricting communications with each of the computers having an IP address on the restricted IP address list.

* * * * *